Sept. 27, 1960 R. L. DE MONTEBELLO 2,953,980
STEREOSCOPY
Filed July 29, 1959 7 Sheets-Sheet 1
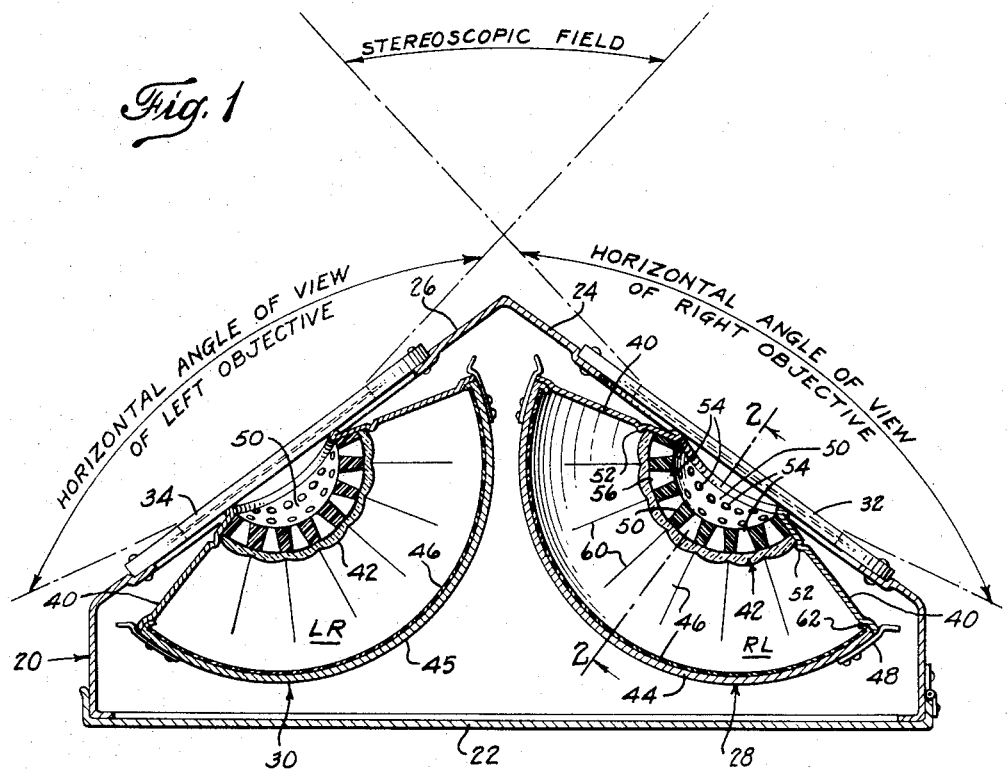
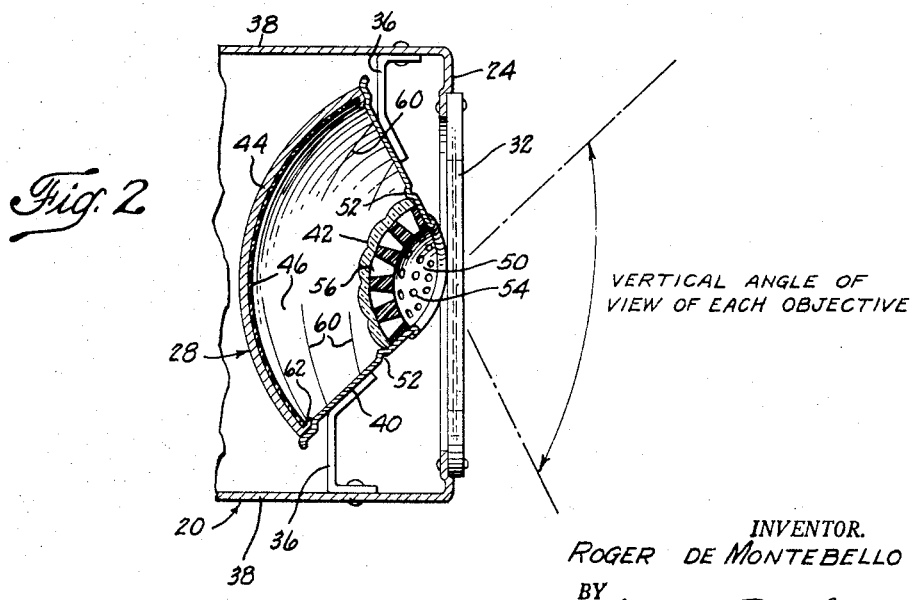
INVENTOR.
ROGER DE MONTEBELLO
BY
Morgan, Finnegan, Durham & Pine
ATTORNEYS

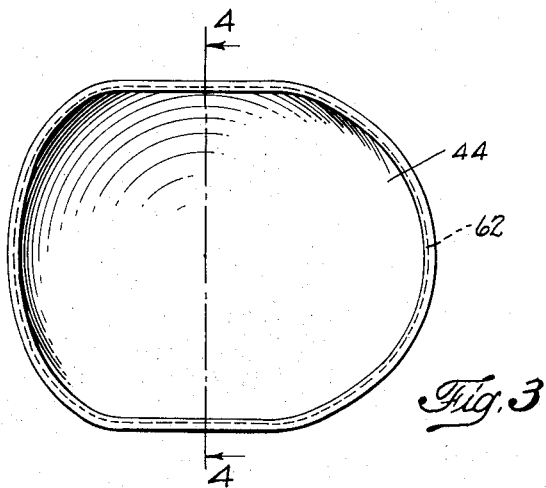
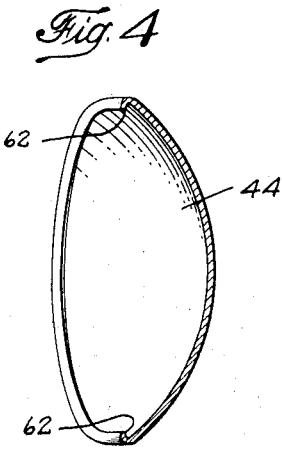
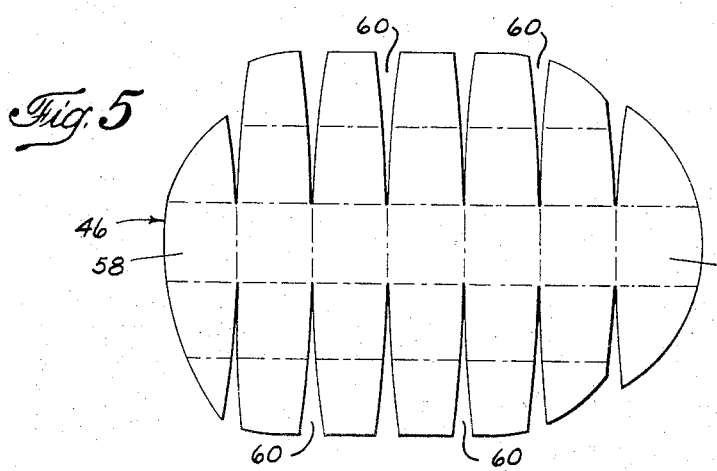
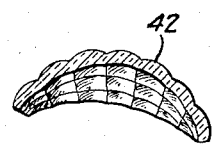
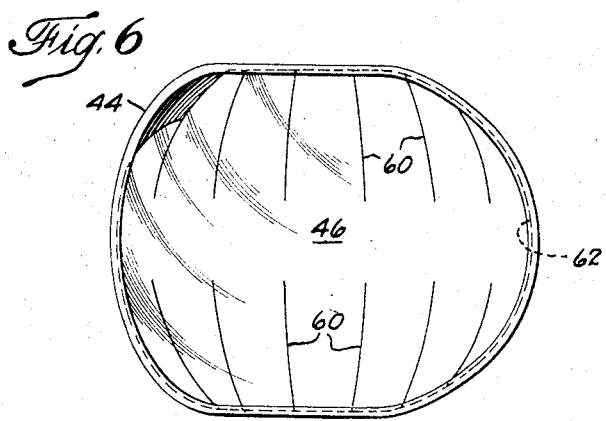
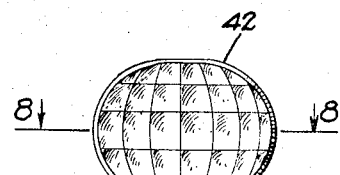

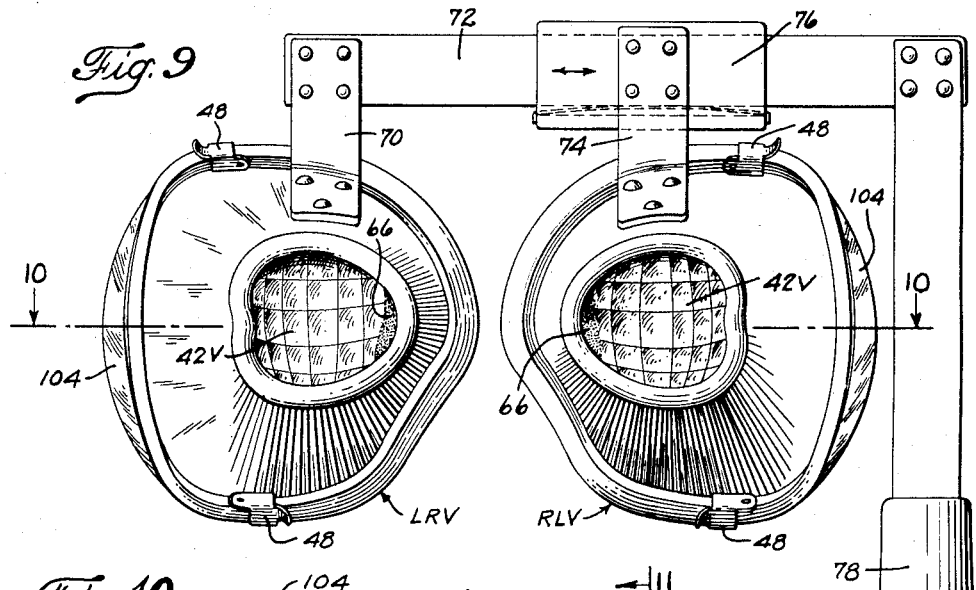
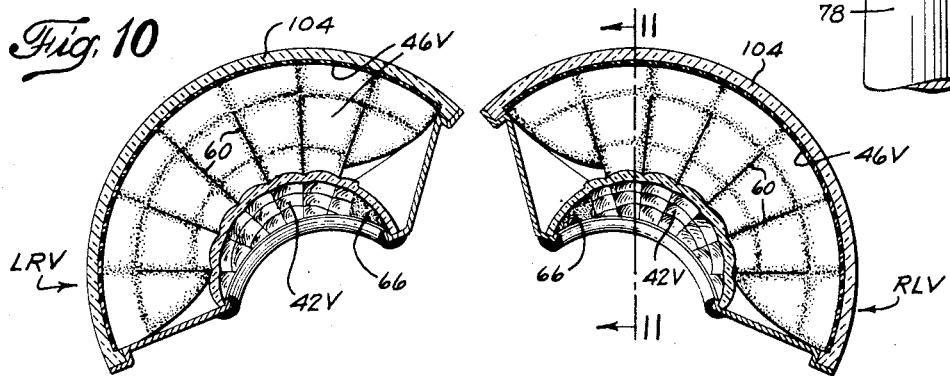
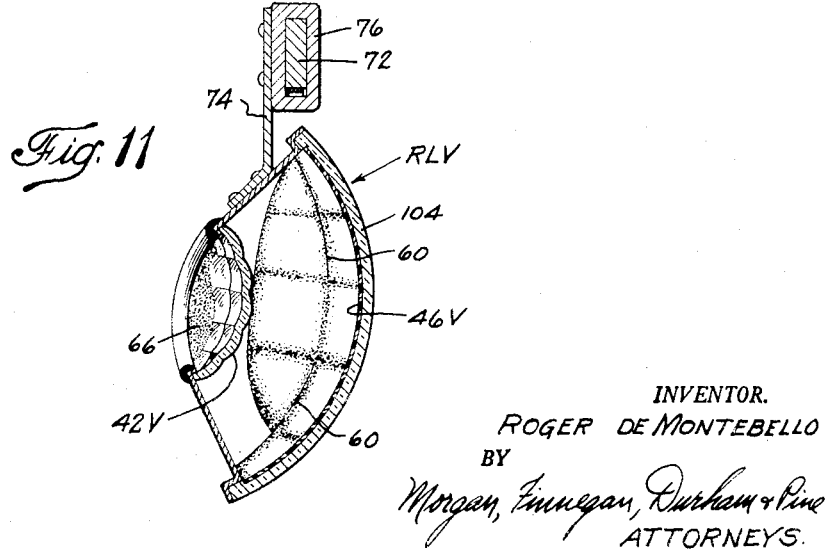

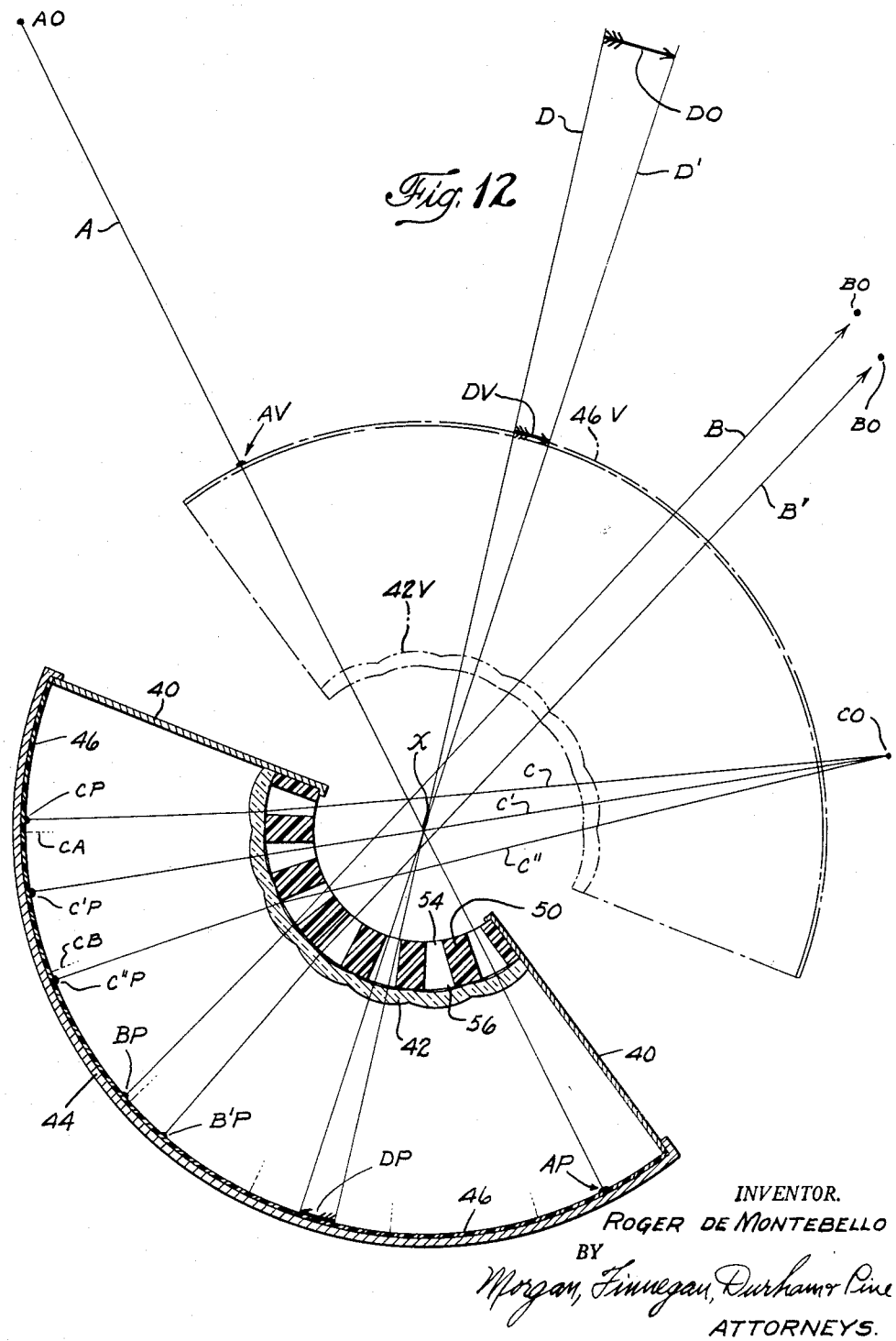

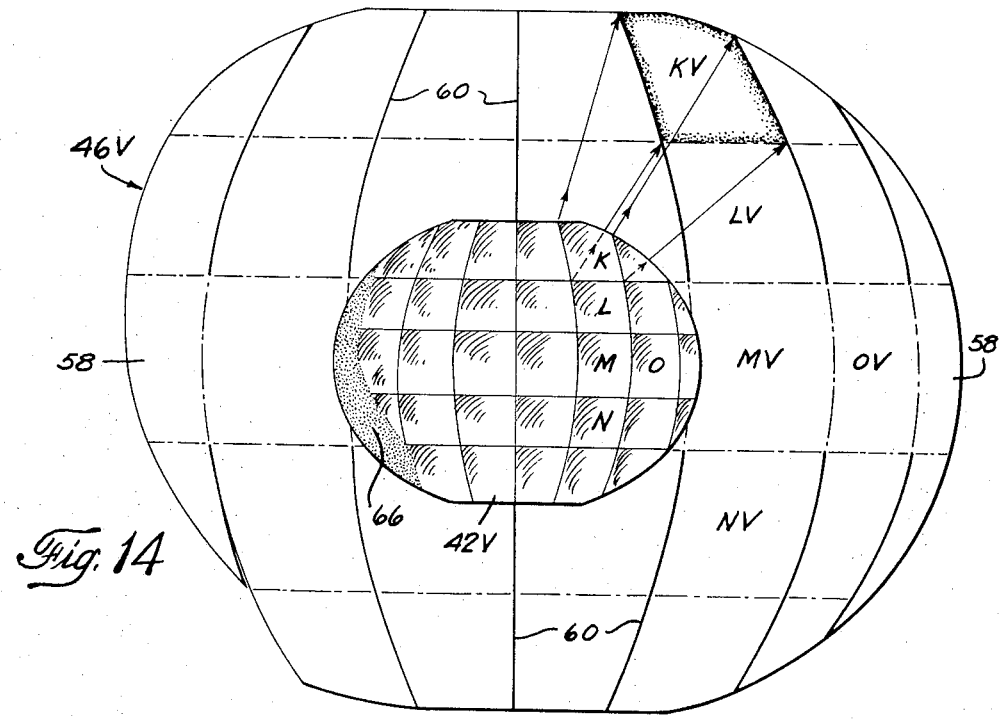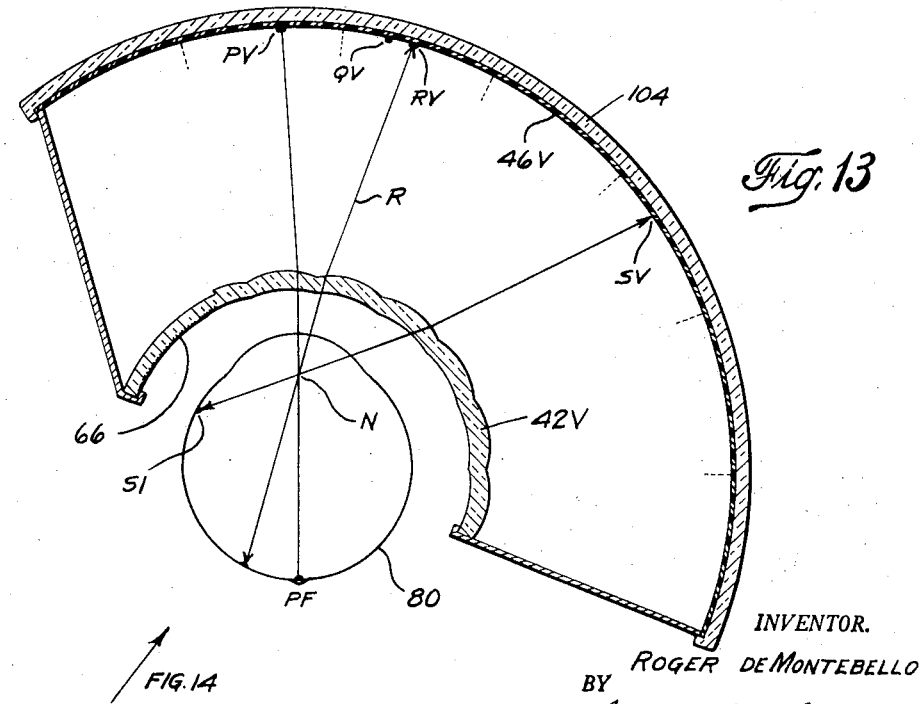

Sept. 27, 1960    R. L. DE MONTEBELLO    2,953,980
STEREOSCOPY

Filed July 29, 1959    7 Sheets-Sheet 6

INVENTOR.
ROGER LANNES DeMONTEBELLO
BY
Morgan, Finnegan, Durham & Pine
ATTORNEYS.

Sept. 27, 1960 R. L. DE MONTEBELLO 2,953,980
STEREOSCOPY
Filed July 29, 1959 7 Sheets-Sheet 7
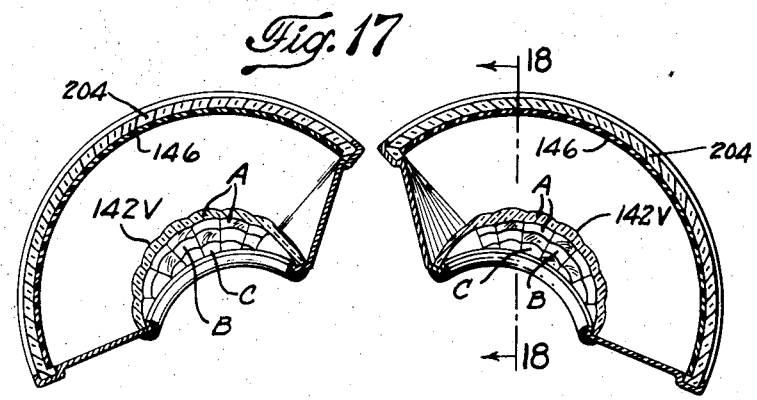
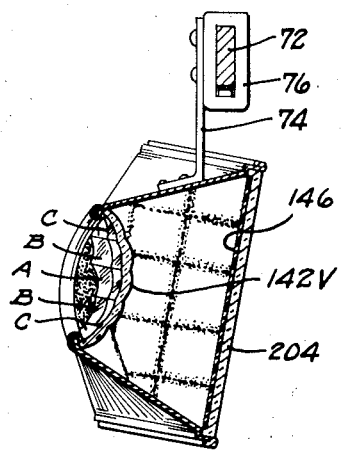
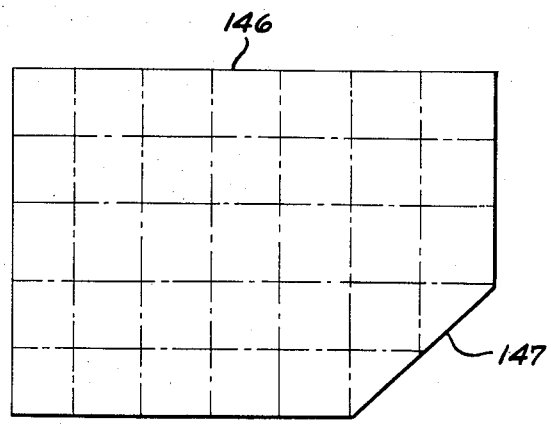
INVENTOR.
ROGER LANNES DE MONTEBELLO
BY
Morgan Finnegan, Durham & Pine
ATTORNEYS.

United States Patent Office 2,953,980
Patented Sept. 27, 1960

2,953,980

STEREOSCOPY

Roger Lannes de Montebello, New York, N.Y. (% Ideax Corporation, 901 Nepperhan Ave., Yonkers 3, N.Y.)

Filed July 29, 1959, Ser. No. 830,214

22 Claims. (Cl. 95—18)

The present invention relates to a novel and improved system of stereoscopic photography.

The application is a continuation in part of my prior application Serial No. 518,790 filed June 29, 1955, now abandoned.

Objects and advantages of the invention will be set forth in part hereinafter and in part will be obvious herefrom, or may be learned by practice with the invention, the same being realized and attained by means of the process, steps and apparatus pointed out in the appended claims.

The invention consists in the novel process, steps and apparatus herein shown and described.

The accompanying drawings, referred to herein and constituting a part hereof illustrate embodiments of the invention, and together with the description, serve to explain the principles of the invention.

Figure 1 is a horizontal schematic section through a camera in accordance with the present invention;

Figure 2 is a vertical section through the embodiment shown in Figure 1;

Figure 3 is an elevation showing one of the backing members forming part of the embodiment shown in Figures 1 and 2;

Figure 4 is a sectional view taken on the line 4—4 of Figure 3;

Figure 5 is a view showing a piece of sensitized film such as is adapted to be used in the present embodiment of the invention and to be supported in the camera by means of the backing member of Figures 3 and 4;

Figure 6 is a view of the backing member of Figure 3 with a piece of sensitized film supported therein and ready to be positioned in the camera for exposure;

Figure 7 is an elevation of the concave face of a lens system such as may be used in the camera embodiment of Figures 1 and 2;

Figure 8 is a sectional view taken on the line 8—8 of Figure 7;

Figure 9 is a rear elevation of a preferred form of viewing apparatus adapted to view the photographs produced by the camera of Figures 1 and 2; this is a view looking from the position of the eyes;

Figure 10 is a horizontal sectional view taken on the line 10—10 of Figure 9;

Figure 11 is a sectional view taken on the line 11—11 of Figure 10;

Figure 12 is a schematic explanatory diagram illustrating the manner in which one of the camera images is formed and later viewed;

Figure 13 is a schematic explanatory diagram showing the position of one of the viewer's eyes with reference to the viewing lens system and the film image to be viewed by that eye;

Figure 14 is an elevation, which is partly schematic, of a film to be viewed, with the lens system for one of the viewer's eyes schematically superimposed thereon, and with one of the normal fields of view shown diagrammatically;

Figure 17 is a horizontal section of a modified embodiment of a viewing apparatus, similar in many respects to the embodiment shown in Figures 9 to 11;

Figure 18 is a vertical section of the viewing apparatus shown in Figure 17; and Figure 19 is a developed view of a piece of photographic film used in the embodiments of Figures 17 to 19.

Figure 15:
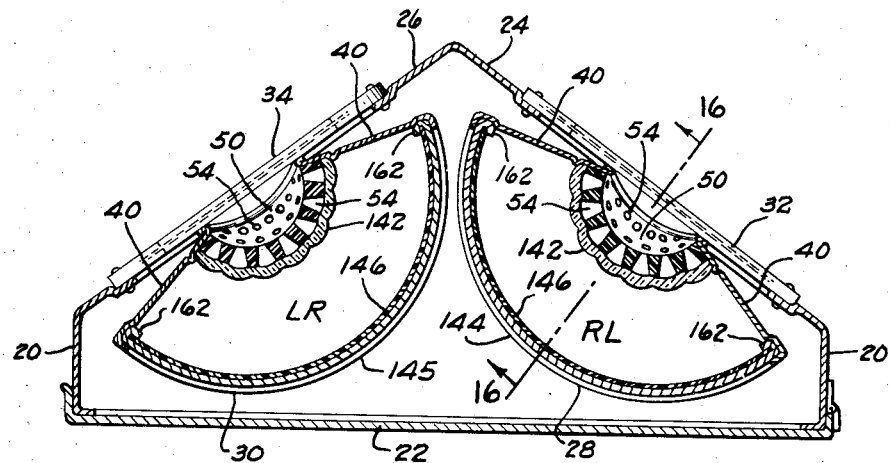
Figure 15 is a horizontal section of a modified embodiment of a camera in accordance with the present invention.

Conventional systems of stereoscopic photography are subject to a variety of limitations which seriously affect their usefulness. Among the defects of known systems are the "window effect" which causes the image to appear as though it were viewed through a distant window without particular spatial relation to the dark surround. Thus the stereoscopic effect must often be exaggerated to produce the desired illusion of stereoscopic perception. Another limitation is the narrow angle of view which may be achieved in a conventional stereoscopic system as distinguished from the normal scope of human vision which normally well exceeds 180° laterally and 90° vertically, and this usual restriction upon the stereoscopic viewing of a photograph results in an unrealistic appearance of the entire view to the viewer, which is avoided by the system of the present invention.

Because of the difficulty of producing wide-angle oculars of short focal lengths (this difficulty is greater than that of obtaining wide-angle taking lenses) the optical size or angular aperture of the solid image as viewed by the eye in the stereoscope is always relatively small, even in cases when wide-angle lenses were used to produce the stereogram. Consequently, stereoscopic views are always limited by edges constituting what is called, in the art, the "window." Depending on the size and distance between the two stereograms, as related to the optical characteristic of the system, the "window" (formed by the visual fusion of the edges of the two stereograms) has a variable apparent size (or subtense, or angle) and appears at an apparent distance which is in inverse proportion to the apparent size.

In taking stereograms the stereo-photographer must, in addition to most of the precautions normal with regular or planar photography, abide by certain limiting rules, e.g. he must consider the object in relation to the "window" (variable or not) created by his camera, i.e. he should never include in his picture objects closer to his camera than the virtual "window," unless these objects are of such size and location as to be entirely included in the edges of said "window." A person placed between the window and the camera and yet "cut" (at the waist for instance) by the edge of that window, when viewed looks transparent, ghostly, unnatural, and there is a tiresome attempt by the eyes to "throw" that person beyond the edges which cut that person photographed.

Even with cameras and viewers having adjustable "windows" real close-ups are impossible, especially if a relatively distant background is to be included also in the picture.

The normal angle in a viewer is in the vicinity of 30°–45° and in a stereo-camera 60°.

It should be borne in mind that a wide angle taking objective would ordinarily be used with a narrower angle viewer and the result would not be ortho-stereoscopic.

In other words, the images produced on the retinas by the stereogram and the resulting projection and fusion in space will not be dimensionally the same as those which would have been produced by the object, had the eyes taken the place of the camera.

Even in the case of a perfect match between camera and viewer, and thereafter obtaining ortho-stereo, there remains a peculiar phenomenon. The eye does not perceive the objects of the limited field in true dimensions and the effect is generally that of miniature objects. This feeling, of course, is partly due to the psychological fact that the observer is holding in his hand a small apparatus and unconsciously expects to see the view within that relatively small space. He does, however, feel that the scene he is peering at through the "window" as well as the window itself are beyond the limited dimensions of the viewer he is holding, but the latter's size nevertheless always binds and restricts to a degree the virtual object's apparent size and distance to smaller dimensions—as the observer cannot (as in life) move and therefore find additional clues.

Another factor for miniaturization of truly "ortho" stereo-views is probably more important still: it is the very existence of the relatively small "window." In real life, if in the back of a dark room an observer keeps totally still and views the outer world through a small window, there are generally no lines of perspective connecting the observer to the outer world. If he and everything else are relatively in a fixed position, there are no clues as to the actual size and distance of objects in the field of vision of the window other than the appreciation of the degree of ocular convergence. Apparently this is not enough alone, and the observer, with only this clue cannot appreciate size or distance except relatively. He will feel the depth or three-dimensional character of the scene; he will, to some degree, know which objects are close and which are farther but he will not feel their real size and distance nor, to be more specific, their size and distance in relation with him (the observer) because there is no visible link between him and those objects.

But let the wall vanish—or let the three walls in front and on his sides vanish—and let the ceiling vanish, and immediately, still without moving, by the sole motion of his eyes, up, down and as far as they can go on the sides, the observer will find links between him and the surroundings and will instantly be able to estimate the size and distance of the objects relative to himself with a reasonable approximation.

To accomplish the above result is one of the objects and probably the main object of the present invention.

In other words, the object of this invention is to provide a stereoscopic system having a taking and a viewing solid angle substantially equal to that of the non-restricted human visual field.

The present invention has for its object the provision of a novel and improved system of taking and viewing stereoscopic photographs which present a more natural stereoscopic appearance to the viewer than has heretofore been provided by conventional systems. A further object is the provision of an improved stereoscopic system in which the photographed and viewed image for each of the human eyes is formed of a plurality of pairs of correlated images, which may be severally viewed in pairs, or viewed in groups of pairs by each eye as the eyeballs are moved in their sockets, thereby enabling the eyes to sweep the field of view and to pass from one pair of images to another without the transition being sensible. The invention has as a further object the provision of a novel and improved system of stereoscopic photography in which the pairs of stereoscopic images are better able to create the correct spatial response when viewed than is now possible with conventional systems of stereoscopic photography or stereoscopic viewing. A further object is the provision of a camera system in which the stereoscopic picture need not be carefully framed to avoid intersection of nearby objects, and which is unrestricted by distance and perspective problems.

The pairs of stereoscopic images viewed according to the system of the present invention preferably present a considerable field of stereoscopic vision, while the image viewed by each eye is largely surrounded by a non-stereoscopic image which may be seen when the eyes are turned and the view by one eye is obstructed as by the nose bridge of the observer. Thus the field of stereoscopic vision substantially reproduces the normal stereoscopic field of vision of the normal pair of human eyes, supplemented by the non-stereoscopic view of the surrounding lateral space which lies at the sides of and beneath the stereoscopic scene and the observer so that the transition from stereoscopic vision to monocular vision is substantially unnoticed except by trained observers whose attention is directed thereto, and not more than in direct vision.

The stereoscopic camera and viewing apparatus of the system of the present invention each comprise a pair of divergently directed optical systems which have a certain degree of overlap in a portion of their apparent fields with an image surface for each of the optical systems, in the one case adapted to photograph the scene and in the other case to permit observation of the photographed scene. Each of the pair of optical systems comprises a curved surface, which is of circular section, on which may be mounted the sensitized material, or for viewing, the developed sensitized material on which the image has been formed and rendered visible. Substantially concentric with the curved, circular-section surface and spaced therefrom is a plurality of relatively short focal-length lenses, of the appropriate, and sometimes substantially uniform, focal length, which are arranged in a uniform pattern and, considered as a group, are adapted to cover a relatively wide angle of view, preferably in excess of 120° laterally and 90° vertically. The film area exposed by each of the lenses during the photographing step is preferably limited and the entire film is covered with images from one lens or another, the image formed by one lens just merging into the surrounding images formed by the adjacent lenses; and in the viewing process, the eye passes from one image or group of images to another as the eye is turned in its socket, the center of the eyeball being more or less concentric with the surface of the film to be viewed as well as with the center about which the array of lenses are grouped. Thus, the apparatus when used as a camera generally includes masking means to limit the image areas, while, if the same or optically duplicate apparatus is used for viewing, the masking means may be omitted.

The film used in the camera and again used in viewing the photographed images is substantially cylindrical or spherical in shape. Where the film is to be used in partispherical form it may be formed from slotted sheet of flat film which may be bent to a substantially partispherical shape, the bending of the film into the spherical shape preferably closing the slots which give the necessary flexibility to the sheet of film, at the same time permitting the film to be reversely warped so that its concave and convex sides are interchanged between the photographing and viewing steps.

In its simplest form, the apparatus of the present invention which provides the possibility of both photographing and viewing the scene, may employ the same or duplicate optical elements for both photographing and viewing, but separate means are provided for mounting the two camera elements during the photographic step. During the viewing steps, as the camera elements are interchanged, the left element of the photographic step becomes the right element during the viewing step, as will be later explained more in detail.

However, it is usually preferable to provide separate taking and viewing systems to provide better accommodation for the viewer's nose, and to avoid the mirror reversal of the images which results when the films are viewed through the rearranged optical elements used for taking the pictures in case the right and left optical elements are not optically identical. Also, it is more convenient to have separate viewing and taking systems.

Many different arrays of substantially uniform or slightly different short-focus lenses may be used in the optical system of the pair of camera and viewing elements, but preferably the lens elements are laid off as polygonal segments of a spherical surface, the several lens elements joining with each other without separation along meridianal and parallel lines, the exterior surface of each lens elements being convex, and the interior surface of each lens element being concave, thereby forming the generally spherical multiple lens as a plurality of adjacent concave-convex or positive meniscus lenses of substantially uniform or very slightly different short focus, generally having a focus length, for example, of the order of one inch. The array of lenses in each of the camera and viewing elements are preferably adapted to cover a horizontal angle of from at least 120° to almost 180° and both lenses cover a total lateral angle of approximately 270°, and a vertical angle of from at least 60° to 100°, thus substantially duplicating the normal solid angle of vision of each of the human eyes.

In the camera system, suitable shutter mechanisms are provided for controlling the exposure of the pair of films and all of the lens elements preferably have substantially the same aperture so that a given opening of the shutter produces a uniform exposure of all of the images formed by the several lenses of the two lens systems. Focussing means need not ordinarily be provided, due to the relatively short focal length of the lenses and the principal objects of most of the scenes to be photographed may be considered to be at infinity or within the acceptable depth of focus. The lateral spacing of the two camera elements is preferably the same as or slightly more than the normal interocular distance of the human eye, although for special conditions and where it is desired to vary the stereoscopic perspective, this distance may be increased or decreased as desired. However, when the camera elements are used as the viewing elements, they are preferably adjustably mounted so that they may be accurately spaced in accordance with the interocular distance of the particular person viewing the images; the mounting also providing for the two lens arrays to be centered with respect to the two eyes of the observer.

During the photographing process, the two separate films are arranged so that they are directed along divergent central paths, but when in viewing position they are directed along convergent paths, the right and left hand camera elements being the left and right hand viewing elements respectively. Also, the films in the camera elements may be transposed as they are viewed, the film in the left hand camera element being positioned in the right hand viewing element, being turned over so that its left edge becomes its right edge, its top edge becomes its bottom edge; similar transpositions being carried out with respect to the film in the right hand camera element. Where the right and left lens arrays are identical mirror duplicates, and each lens array is symmetrically identical with respect to a central horizontal line, and the lens arrays of the camera and viewing apparatus are identical, the films will be inverted and reversed and reversely curved without being transposed between taking the viewing.

The nature of the sensitive material is a matter of choice and it may be conventional black-and-white or color film, and, of course, the reproductions to be viewed may be photographic or other good quality reproductions, such as those produced by any suitable graphic arts process.

It will be understood that the foregoing general description and the following detailed description as well are exemplary and explanatory of the invention but are not restrictive thereof.

Referring now in detail to the present preferred and illustrative embodiments of the present invention which are shown rather schematically in the accompanying drawings, it being understood that conventional optical elements may be used in many instances. A camera system is shown in Figures 1 to 8 of the drawings, a viewing system is shown in Figures 9 to 11, and some of the elements of the viewing system may, if desired, be the same as those of the camera system. Figures 12 to 14 are schematic views illustrative and useful in describing the optical principles on which the present invention is based.

In the camera system of the preferred embodiment of the invention, there is provided a light-tight box 20 having a hinged rear wall 22 through which access may be had to the interior of the camera for changing film. The front wall of the camera preferably comprises two divergent portions 24 and 26, suitably spaced from the rear wall and serving to support the right and left camera elements 28 and 30, and their respective shutter mechanisms 32 and 34, the camera elements being mounted within the box 20 by means of the brackets 36 which may be fastened to the upper and lower walls 38 of the box. Each of the camera elements comprise a frusto-conical support member 40, conveniently of irregular cross section, the smaller end of the cone being directed forwardly and serving to support the lens array 42, while the large and rear end of the cone is adapted to engage and support the film holder 44 and 45. A film holder comprises a spherical member which has its periphery shaped to fit the rear edge of the conical member 40 so as to retain a generally spherically shaped piece of sensitized film 46 therein as the film holder is held against the conical member by means of the securing clips 48 which engage the edges of the conical member.

Between the film holder 44 and the forward end of the conical member 40 is supported a generally spherical lens array 42, which is shown more in detail in Figures 7 and 8, the lens array being substantially concentric with the film holder 44 and being positioned so that film 46 lies in correctly focussed position with respect to the several lenses of the lens array 42.

Immediately in front of the lens array 42 is mounted an aperture and masking member 50 which is provided with suitably arranged apertures which control the aperture of the several lenses of the array and also control the area or spread of the images formed by the several lenses. The masking member 50 as well as the lens array are preferably held in proper assembled position by means of a slight ridge 52 formed in the conical support member 40. The aperture and masking member 50 is provided with apertures 54 equal in number to the number of lens elements in the member 42, each of the apertures preferably being positioned on the optical axis of the lens element, and all of the apertures being of substantially the same size so as to equalize the exposure of the film through the various lens elements. The member 50 is also formed with a plurality of generally pyramidally shaped openings 56 each of which has the same general shape as the area of the film 46 to be exposed by the particular lens, so that the images formed by the several lenses do not overlap substantially but rather blend into each other. The enlarged portion of the openings 56 in general corresponds to the shape of their respective lens elements, but are reduced in size commensurately with the opening of the apertures 54 and so as to provide the blended margins of the image areas formed by each lens element.

The film or other piece of sensitized material 46 is shown in Figures 5 and 6, as the film is formed for viewing by the right eye and for photographing in the right hand position. In Figure 5, the film 46 is shown divided by dotted lines for explanatory purposes only and is thus divided into a number of areas corresponding to the number of lens elements in the lens array 42. Thus, in the illustrative embodiment there are provided 32 such areas which are divided and arranged in accordance with the number and distribution of the lens elements in the array 42. The band of film areas 58 across the horizontal portion of the film 46 are generally rectangular in shape while the areas above and below the horizontal band are tapered and the vertical groups of such areas are separated from each other by slits 60 of increasing width which are so proportioned that when the slotted sheet of film 46 is warped into a generally spherical shape the slits 60 are closed and all of the film areas are brought closely adjacent each other, as shown in Figure 6, the center of each of the film areas being substantially radially disposed with respect to the center of its respective lens element.

The film holders 44 and 45 are preferably formed with an inturned film holding edge 62 so that the film may be positioned and held within the film holder merely by pushing the film firmly against the surface of the film holder, and may be removed therefrom by flexing the film so as to disengage one edge of the film from the edge 62 by which it is held. When in the proper position within the holder, the film forms a substantially continuous surface on the film holder, and this surface is substantially spherical, although some insignificant flattening of the areas will be observed in each of the image areas. The film holder 44 and the corresponding film 46 have been described in detail with respect to the right hand position of the camera, and it will be understood that the film holder 45 and the corresponding film for that holder for the left hand position are substantial duplicates of those for the left hand position except that they are mirror images of each other.

The lens array is shown in detail in Figures 7 and 8 and comprises the generally partial-spherical member 42, the array shown in the drawings being the one for the right position during photographing. The lens elements are preferably arranged in the pattern shown in the drawing, and the opposite lens would be arranged in a mirrored position compared with those shown. Each of the lens elements comprises a positive meniscus lens, and the several lens elements are preferably formed as a part of an integral member forming the array, being conveniently moulded from a plastic material such as methylmethacrylate or polystyrene.

In the viewer, certain of the lens elements are preferably masked, for instance, those for viewing areas to be adjacent the nose of the observer when viewing the photographed scenes so as to avoid the disturbing effect of the observer trying to form a distinct image of the inner edge of the film and film holder near his line of sight normally unsharply obscured by his nose. As shown, such elements may be opaque or translucent as indicated at 66 in Figure 14.

A stereoscopic photograph in accordance with the present invention and to be viewed by the viewing apparatus of the present invention as shown in Figures 9 to 11, is made by loading the film holders 44 and 45 with suitable sensitized material and positioning the loaded film holders in the respective camera elements, after which they are simultaneously exposed to the desired scene and with the correct exposure, and are processed in the normal manner for the particular kind of sensitive material employed.

Figure 12 is a schematic optical diagram showing the relation of various of the simultaneous images to each other in the camera position as well as in the viewing position, the long straight lines on the diagram not being used to indicate ray and beam paths, but rather for other explanatory purposes.

The line A on Figure 12 indicates a single light beam centered on the optical axis of one of the lens elements of the lens array 42 and passing through the center X of the system about which the lens array 42 and the film 46 are spherically curved. As is shown on the diagram, the object AO forms the photographic image AP on the film surface 46 by the beam A which passes through the center X of the optical system. The object AO may be considered as being at any distance from the film surface and the lens element.

In the upper circular part of the diagram, Figure 12, the film surface 46 is shown after it has been processed to provide a visible image, and in its viewing position it is designated as 46V. In the viewing position, the film has been effectively circumferentially moved 180° from its photographed position with respect to its center of curvature, and has been additionally inverted so that its former top is now its bottom, and it has also been reversely warped so that its former concave side is now its convex side. Thus the photographed image of the object AO has become the visible image AV which is in a position to be viewed by one of the viewing lens elements of the lens array 42V.

The object BO, indicated by the two dots, may be considered as being a signle object at an infinite distance, from which a parallel beam of rays passes approximately through the optical center X, rays B passing through one of the lens elements, while another adjacent rays B' pass through another one of the lens elements. The rays B form the image BP, while the rays B' form the image B'P on the film surface 46, thus providing two images of the same object as the two images are formed by two adjacent lens elements. Although Figure 12 is shown as a horizontal section, several additional images may be formed by the vertically adjacent lens elements, and in certain special positions of the object with respect to the lens elements, and with certain arrangements of lens elements as many as eight more or less complete images of a small object may be formed surrounding a single central principal image.

In Figure 12, the diagram, due to its small size, is merely explanatory and does not attempt to show the refraction of the rays as they pass through the lens elements of the lens array 42. If shown with great precision, certain of the images shown on Figure 12 would be displaced slightly, but not sufficiently to make any substantial difference in the effects described.

The object indicated by the dot CO is intended to represent an object extremely close to the center of curvature X, for instance within a few inches of the lens array 42 when used as a camera. The object CO is represented as being directly in line with the optical axis of one of the lens elements of the array 42, and rays C' are shown as passing directly through the center or axial portion of the lens element to form an image C'P on the surface of the film. The angular extent of the total image formed by that lens is shown by the lines CA and CB which are joined to the center X and again show the performance of the lens, without there being any attempt to show the refraction of the lens as it bends any particular ray. The object CO will also form other images as indicated by the rays CP and C"P, near the lateral limits of the images formed by the lens elements which transmit these rays and which lie adjacent the points CA and CB or will produce a slight blending of the images at their adjacent borders.

All of the other lens elements act similarly and form images of objects within their field of view, at least one such image being formed and usually more than one image, but, as will be explained more in detail, it is remarkable that only one and then another image is included within the principal field of view of the observer when the film is properly viewed.

The angular width of an object as photographed and viewed is illustrated by means of the straight lines D and D' which show the angular extent of the object DO and its photographed image DP as well as the image to be viewed DV (the repositioned image DP) when viewed with the same optical system as was used to make the image DP and when the central point of the eyeball is substantially at the center X, as will be described later more in detail.

The system for the left eye is preferably a mirror-duplicate of the system shown in Figure 12, and the stereoscopic field or lateral overlap is usually of the order of 90°, or from at least 60° to usually not more than 100° to provide a complete binocular lateral viewing angle of approximately 270°. The taking and viewing systems are usually adjusted so as to provide a total lateral viewing and taking angle in excess of 180° or as wide as the normal human field, which approximates 270°, and an appropriate vertical angle which is preferably arranged with respect to the horizontal so as substantially to duplicate the encompassed angle of view of the normal human eye.

For completely accurate ortho-stereoscopic vision, the lateral angle may be reduced to as small as an angle of 120° or even less. However, the system of the present invention provides a taking and viewing system in which the included solid angle may be as much as 6, 8 or more times the area of conventional systems. Thus the ordinary system for taking and viewing a scene may include a horizontal angle of about 30° and a vertical angle of about 22°. According to the present invention, the lateral binocular angle approximates 270° and the vertical angle may be 100° or more. In the conventional system the area is represented by 22×30 equals 660°, while in one embodiment of the present invention the solid angle may be represented by 270×100 equals 27000 or more than 40 times the area of the convention solid angle of the scene.

Figures 9 to 11 illustrate a typical and preferred embodiment of the viewing apparatus forming part of the present invention. As shown, the viewing apparatus is specifically designed to permit viewing of the photographed images produced by the camera system described above. As preferably embodied, and as illustrated the viewing apparatus may comprise the same elements as were used for the camera system, or duplicates thereof, remounted for convenient use in viewing the images.

Figures 9 and 10 illustrate the viewing apparatus in rear elevation and in horizontal section, while Figure 11 shows the viewing apparatus in vertical section. The two viewing elements RLV and LRV may be the same, and are preferably optically identical with but slightly different structurally from elements LR and RL, respectively, of the photographic camera apparatus shown in Figures 1 and 2.

Considered with reference to the diagram of Figure 10, the viewing element LRV is the lens element RL of Figure 1, after that element has been inverted, while the element RLV is the camera element LR after it has been inverted. In other words, the elements have been rearranged so that the right and left hand film elements and the optical elements have been inverted.

For use in the viewing apparatus shown in Figures 9, 10 and 11 the elements RLV and LRV are provided with means by which they may be accurately positioned with respect to each other and with respect to the human eyes by which they are to be observed. The element LRV is rigidly fixed to a horizontal member 72 by means of a bracket member 70, while the element RLV is mounted for horizontal movement on the member 72 by means of a bracket 74 and a slidable member 76, and handle means 78 are provided by which the assembly may be conveniently held for viewing.

Thus, in viewing position each of the elements RLV and LRV has been inverted and these elements have been circumferentially displaced so that each is 180° from the position in which it, or its duplicate, was used for photographing the original scene.

The viewing elements RLV and LRV preferably do not include the aperture and masking means 50 of the camera units, and the viewing element lens arrays 42V are provided with roughened translucent areas 66 to obscure vision in line with the observer's nose, as explained above, but may otherwise be identical with the camera units, except that the film supporting members 104 of the viewing units are formed of light-transmitting and preferably light-diffusing material, such as translucent plastic, while in the camera elements the film holding members 40 and 45 are usually formed of blackened sheet metal.

The slidable member 76 provides a means in the viewing apparatus by which the viewing elements may be laterally adjusted with accuracy to adapt themselves to the various interpupillary distances which are encountered in pairs of human eyes, and for viewing the elements RLV and LRV are adjusted so that their respective centers are preferably approximately centered on the central points of the human eyeballs by which they are to be viewed.

It will be noticed, by reference to Figures 2 and 11, that, due to the inversion or 180° translation of each of the camera or viewing elements, that in the photographing position (Figure 2) the film 46 is largely above the center of the lens array 42, while in Figure 11, the viewing position, the film 46V is largely below the center of the lens array 42V.

Figure 12 shows the position of the viewed image AV which is the developed image corresponding to the optical image AP but in viewing position, and the same is true of the visible images BV. The image DV is shown in its lateral extent and shows that the angular width of the visible image DV is the same as the angle subtended by the object DO. Thus all of the objects are seen in their correct position and in their apparently correct size.

Figure 13 of the drawings is a schematic sectional view showing the viewing apparatus for one eye in relation to that eye. The human right eye 80 is shown as looking straight ahead and the viewing apparatus for that eye is shown in the correct angular orientation and correctly centered with respect to the lens system of the eye 80. The nodal point of the eye is indicated by the point N, while the point PF indicates the posterior pole of the eye, and the fovea centralis superimposed for simplicity. In the diagram, the gross refraction is shown, without attempting to show the refraction of the rays as they pass through the successive portions of the optical system of the eye.

The eye 80 is looking forward through one of the lens elements of the array 42 and slightly off the optical axis of the lens element so that the image PV is seen by the eye at the fovea PF. With the eye in a stationary position, and due to its peripheral vision it can also look through the adjacent lens element of the array 42V but it cannot see the adjacent image QV as the ray R and the image RV indicate the extreme left angular position of an image which can be seen by the eye in the position shown as it looks through the lens element which serves to pass the ray R. However, as the eye is rolled to the right, these conditions change and the eye could then see the image QV, but would no longer be able to see the image PV.

As the eye looks forward from the position shown in Figure 13, it can also see peripheral images, and one image seen by peripheral vision is shown at SV which forms the visual image SI on the peripheral portion of the retina of the eye.

As the eye is rotated to the right or left from the position shown in Figure 13, its relation to the several lenses of the array 42V is changed so that other portions of the visual images on the film 46V may be seen, and with certain movement of the eye a different group of image areas of the film 46V are seen through the lens array 42V.

Figure 14 is a schematic diagram looking at the rear face of the film 46V and its translucent support member 104 in the direction of the arrow shown in Figure 13. This Figure 14 illustrates the relation of the 32 lens elements of the lens array 42V with respect to the film surface 46V and its individual image areas. As illustrated, the lens elements K, L, M, N and O serve for viewing their respective image areas KV, LV, MV, NV and OV, and the same is true of the remainder of the lens and image area elements. Thus an individual taking and viewing lens element is provided for each of the image elements formed on the film 46, the image elements being sharply defined or only slightly merging into each other along their borders. While there are shown 32 lens and image area elements, any suitably larger or smaller number may be employed.

When the pair of transparency films 46V are viewed through their respective viewing systems they produce an extremely wide angle ortho stereoscopic view, without the window effect or other limiting edges, and substantially showing the entire scene of the field in true directional and dimensional relation to the observer.

While the invention has been described and illustrated with respect to its preferred form, in which separate means are provided for taking and viewing the images of a scene, it is obvious that the taking system may be used for viewing the images of the scene.

The modified embodiment of the present invention as shown in Figures 15 to 19 provides a somewhat simplified form of construction, in accordance with the same general principles as set forth above. In many respects, the parts shown in Figures 15 to 18 are similar to those shown in the earlier described figures, and the film shown in Figure 19 is differentiated from the film shown in Figures 5 and 6 in that it is unslotted and is adapted to be curved into a particylindrical form during exposure and also during viewing.

Figure 16:
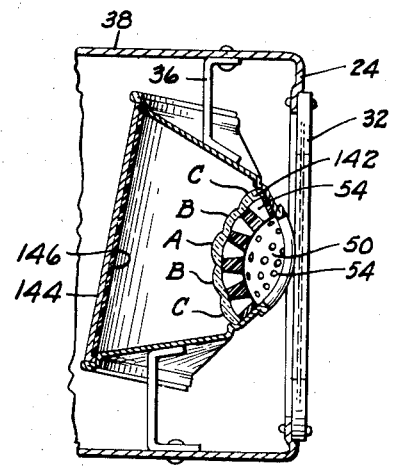
Figure 16 is a vertical section taken on the line 16—16 of Figure 15.

The stereoscopic camera shown in Figures 15 and 16 is, in horizontal section, similar to that described with reference to Figures 1 and 2, except that the film holding members 144 and 145 are parti-cylindrical, and are each adapted to hold an unexposed sheet of film 146 by engagement of the lateral edges of the film with the inturned film holding edges 162 with the film bent into a cylindrically curved shape and held substantially concentric with the radius of curvature of the film holder 144 or 145, and also substantially concentric with the spherically curved array of lenses 50.

The parti-spherical array of lenses 142 all have relatively short focal lengths and are conveniently of the order of one-inch focal length, but the several horizontal rows of lenses are of slightly different focal lengths, the central row A being of the shortest focal length, the next upper and the next lower rows B of lenses being of slightly longer focal length, while the top and bottom rows C are of even slightly longer focal length, the lenses in each row being of substantially the same focal length as the other lenses in the same row. Thus, as shown in Figure 16, the lenses in row A may have a focal length of 1.00 inch, those in rows B a focal length of about 1.05 inch, and those in row C, a focal length of about 1.10 inch, thereby allowing all of the lenses to be arranged in a spherically curved pattern, about a common center which is also the center of curvature of the cylindrical member 144 (or 145), at the same time providing for all of the lenses to be properly focussed on the film 146, despite the fact that the top and bottom edges of the film are spaced further from the center of curvature and from their corresponding lenses than is the central horizontal portion of the film.

Figures 17 and 18 show the modified form of the viewing apparatus, which is generally similar to that form shown in Figures 9, 10 and 11 of the drawings, except that the translucent film holders 204 are parti-cylindrical in shape and are adapted to hold the sheets of film 146 bent into parti-cylindrical shape. The parti-spherical lens arrays 142V are constructed and arranged in the same manner as the lens arrays 142 in the camera, except that the viewing lenses are not provided with the apertures stops 54, nor with the separating partitions 50. As was described in connection with the camera lenses 142 of Figures 15 and 16, the viewing lenses are of equal focal length in each of the horizontal rows, the lenses of the central row being the shortest in focal length and those of the outer rows being of slightly longer focal length, while the intermediate rows have lenses of intermediate focal length.

Figure 19 shows a piece of unexposed film 146 for the left hand camera, with one corner shown as cut away, as at 147, to accommodate the viewer's nose when the film is reversely bent after processing and used in the left hand portion of the viewer. The film for the right hand camera and viewer is a mirror duplicate of the film shown in Figure 19.

On the piece of film 146 in the drawing, there are shown dot-dash lines which show in a general way, the boundaries of the image fields of the several lenses in the camera, as well as the separate image areas of the exposed and developed film as it is to be viewed.

In use, the camera and viewer of Figures 15 to 18 are used and operated in the same manner as has been described in detail in connection with Figures 1 to 14.

What is claimed is:

1. A stereoscopic system including two groups of spherically arranged lens arrays, each lens array comprising a plurality of adjacent short focal length lenses, means for holding two curved areas of film material in focused position with respect to the lenses, the areas of film material and their respective lens arrays being located substantially concentric with each other and the areas of film material and their respective lens arrays being so arranged that the lenses form substantially contiguous image areas on the material, and viewing apparatus comprising means for supporting said areas of exposed film material in a curved position each substantially concentric with one eye of an observer and adapted to receive a plurality of short focal length lenses between the material and the observer's eye and substantially concentric with the respective eyes.

2. A stereoscopic system according to claim 1 in which the film material holding means and the film material supporting means are cylindrically shaped and are concentric with the lens array.

3. A stereoscopic system according to claim 1 in which the film material holding means and the film material supporting means are parti-spherically shaped and are concentric with the lens arrays.

4. A stereoscopic camera comprising in combination, means for supporting two areas of photographic film, a lens array for each film area and means for divergently mounting the supporting means and lens arrays, each supporting means comprising a curved surface, circular in section, for holding a film area in a shape having a curved section, each lens array comprising a plurality of short focus lens elements arranged in a generally spherical shape of smaller radius than the film surface but concentric therewith, the several lenses of the array being arranged to form substantially contiguous images on the sensitized material, and aperture means for the several lenses, said mounting means comprising means for holding the lens arrays and their supporting means in divergent positions with a portion of the field of the two arrays overlapping.

5. A stereoscopic camera according to claim 4 in which separate shutter means are provided for each of the lens arrays.

6. A stereoscopic camera according to claim 5 in which the lens elements of each array are arranged in several rows, one row being on the equator and the other rows being parallel therewith, the lens elements of the several rows being meridianly alined.

7. A stereoscopic camera according to claim 4 in which each supporting means is cylindrically curved.

8. A stereoscopic camera according to claim 4 in which each supporting means is parti-spherical in curvature.

9. Stereoscopic apparatus comprising in combination means for supporting two curved areas of photographic film circular in section, a lens system for each film comprising a concentric spherical array of lens elements of substantially the same focal length, said lens elements being arranged in a plurality of rows, the rows being parallel to an equator of the sphere, and the several rows having their lens elements meridianly alined, and means for mounting the supporting means and lens arrays so that their fields overlap.

10. Stereoscopic apparatus comprising in combination, means for supporting two generally spherical areas of photographic film, a lens array for each film comprising a plurality of short focus lens elements arranged in a generally curved shape, circular in section and concentric with and smaller than the film, the lens elements being arranged to form adjacent images on the film and means for mounting the lens arrays and film supports so that some of the lens elements of one array have fields overlapping the fields of some of the lens elements of the other array.

11. A stereoscopic apparatus as claimed in claim 10 in which the two film supports and two lens arrays are substantially mirror duplicates of each other.

12. A stereoscopic apparatus as claimed in claim 11 in which each lens array is a unitary member having a plurality of contiguous positive meniscus lens elements.

13. A stereoscopic camera as claimed in claim 10 in which an aperture plate is provided in front of the lens array and provides uniform apertures for each of the lens elements.

14. A stereoscopic camera as claimed in claim 13 in which the film is divided into sections and the lens elements form images on the respective sections.

15. A viewing apparatus according to claim 10 in which each film support is cylindrically curved.

16. A viewing apparatus according to claim 10 in which each film support is spherically curved.

17. A viewing apparatus comprising a circularly curved translucent film-holder, a smaller, generally spherical lens array substantially concentric with the film holder, the lens array comprising a plurality of elements of the same general focal length arranged so that different parts of the film surface may be viewed through one or another of the lens elements.

18. A viewing apparatus according to claim 17 in which each film holder is cylindrically curved.

19. A viewing apparatus according to claim 17 in which each film holder is spherically curved.

20. A stereoscopic viewing apparatus comprising two circularly curved translucent film-holders, means for adjustably mounting the film holders so they may be each positioned substantially concentric with the human eyes, and two smaller generally spherical lens arrays substantially concentric with the respective film holders, each lens array comprising a plurality of elements of the approximately same focal length arranged so that each part of the film surface may be viewed by an eye using at least one of the lens elements.

21. A stereoscopic viewing apparatus according to claim 20 in which the film holders and lens arrays are respectively substantially mirror duplicates of each other.

22. A stereoscopic viewing apparatus according to claim 20 in which the lens arrays each comprise a plurality of positive meniscus lens elements contiguous with each other.

References Cited in the file of this patent

UNITED STATES PATENTS 2,833,176    Ossoinak _____ May 6, 1958